(12) United States Patent
Zhang et al.

(10) Patent No.: US 8,103,177 B2
(45) Date of Patent: Jan. 24, 2012

(54) APPARATUS AND METHOD FOR FREQUENCY OFFSET MONITORING USED IN DIGITAL COHERENT OPTICAL RECEIVER

(75) Inventors: Huijian Zhang, Beijing (CN); Lei Li, Beijing (CN); Zhenning Tao, Beijing (CN); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 464 days.

(21) Appl. No.: 12/320,740

(22) Filed: Feb. 3, 2009

(65) Prior Publication Data

US 2009/0245815 A1    Oct. 1, 2009

(30) Foreign Application Priority Data

Apr. 1, 2008   (CN) .......................... 2008 1 0090227

(51) Int. Cl.
*H04B 10/06* (2006.01)

(52) U.S. Cl. ........ 398/208; 398/202; 398/204; 398/209; 398/25; 375/325; 375/344; 375/341; 375/279

(58) Field of Classification Search .................. 375/341, 375/329, 279, 326, 295, 325, 344, 232, 327; 398/202, 204, 208, 209, 205, 206, 207, 212, 398/214, 213, 25, 26, 27, 158, 159, 162, 398/163, 164, 154, 155, 79, 152, 188, 183, 398/203, 33, 210, 38

See application file for complete search history.

(56) References Cited

U.S. PATENT DOCUMENTS 7,747,177 B2 *   6/2010   Chen et al. ..................... 398/206
7,899,340 B1 *   3/2011   Bontu et al. ................... 398/209

* cited by examiner

*Primary Examiner* — Hanh Phan
(74) *Attorney, Agent, or Firm* — Staas & Halsey LLP

(57) ABSTRACT

The present invention discloses a frequency offset detecting apparatus and method for use in a digital coherent optical receiver. The digital coherent optical receiver comprises: a front-end processing section for generating a digital baseband electric signal; an equalizer for performing equalized filtering on the digital baseband electric signal; and the frequency offset detecting apparatus for detecting frequency offset contained in the digital baseband electric signal or frequency offset contained in a signal outputted by the equalizer; wherein the frequency offset detecting apparatus comprises an argument difference obtaining unit, a first subtracter, a second subtracter, a quantizer and an averager, of which the argument difference obtaining unit obtains an argument difference of adjacent symbols in a signal inputted therein; the first subtracter subtracts an output of the averager from the argument difference obtained by the argument difference obtaining unit; the quantizer performs uniform quantization with predetermined intervals on an output of the first subtracter; the second subtracter subtracts an output of the quantizer from the argument difference obtained by the argument difference obtaining unit; and the averager averages an output of the second subtracter.

11 Claims, 7 Drawing Sheets

APPARATUS AND METHOD FOR FREQUENCY OFFSET MONITORING USED IN DIGITAL COHERENT OPTICAL RECEIVER

CROSS REFERENCE TO RELATED APPLICATIONS

This application claims the benefit of Chinese Application No. 200810090227.4, filed Apr. 1, 2008 in the State Intellectual Property Office of the P.R. China, the disclosure of which is incorporated herein by reference.

FIELD OF THE INVENTION

The present invention relates to a digital coherent optical receiver, and more particularly, to a frequency offset detecting apparatus and method used in a digital coherent optical receiver.

BACKGROUND OF THE RELATED ART

In comparison with conventional intensity modulation-direct detection or phase modulation-delayed interference detection technologies, coherent optical communication technology can tolerate lower optical signal-to-noise ratio, compensate linear damage by using digital signal processing technology, and achieve higher spectral usability. These advantages of the coherent optical communication technology satisfy the demand on higher single wavelength rate and higher spectral efficiency of next-generation optical communication networks, and hence arouse great interests in people.

In a coherent optical receiver, signal light is mixed with local oscillation light generated by a local laser, and a baseband electric signal capable of reflecting electric field envelope of the signal light is then obtained after photoelectric transformation. The original transmission signal can be recovered by performing sampling quantization and digital signal processing on the baseband electric signal. In practical application, however, it is impossible to guarantee that the frequency of the laser in the transmitter and the frequency of the laser in the receiver are identical, so that there is nonzero intermediate frequency, namely frequency offset, in the baseband electric signal. At present, aberration in the nominal emission frequency of a commercially available laser is up to ±2.5 GHz, and in such a circumstance, frequency offset in an actual system can reach as high as ≅5 GHz. Consequently, frequency offset in the coherent optical receiver must be detected (with the detecting range reaching at least ±5 GHz), so as to control or compensate the frequency offset. On the other hand, the optical communication system continuously operates at a very high signal rate, there is hence a demand for low complexity and high precision on the frequency offset detecting method.

FIG. 1 shows the structure of a known coherent optical receiver. As shown in FIG. 1, a 90-degree optical mixer 103 mixes a received optical signal 101 with a continuous light 102 outputted from a local oscillation laser 104 and outputs the same to balanced photoelectric detectors 105 and 106. The balanced photoelectric detectors 105 and 106 convert the optical signal respectively into a cophase component and a quadrature component of baseband electric signals. Subsequently, a discrete digital baseband complex signal 109 (sometimes also referred to as complex signal discrete sequence, complex signal sequence or complex signal sampling sequence) is obtained from the two branches of baseband electric signals after sampling and quantizing by analog-to-digital converters 107 and 108. The local oscillation laser 104, the balanced photoelectric detectors 105 and 106, and the analog-to-digital converters 107 and 108 constitute a front-end processing section of the digital coherent optical receiver. An electric equalizer 110 performs equalized filtering on the complex signal sequence 109 to compensate linear transmission damage, and chromatic dispersion of a signal 111 outputted thereby is almost completely compensated. A follow-up digital signal processing module 116 performs carrier wave phase recover, differential decoding and the like on the signal 111 to thereby recover the transmitted data 117. Since there is frequency offset between the carrier wave and the local oscillation laser, one branch is divided from the complex signal 109 to the frequency offset detecting apparatus 112 for frequency offset detection there. If it is desirable to prevent such damage as the chromatic dispersion from affecting frequency offset detection, it is also possible to divide one branch from the signal 111 as outputted from the equalizer as input into the frequency offset detector. The frequency offset detecting apparatus 112 performs corresponding processing on the signal 109 (or the signal 111) to obtain a detection signal 113, and uses it for frequency offset control. There are two working modes for frequency offset control. The first mode is the feedback control mode, whereby the frequency offset detecting apparatus 112 outputs the detection signal 113 to a local oscillation controller 114, and the local oscillation controller 114 converts the frequency offset detection signal 113 into a local oscillation frequency control signal 115, so as to tune the output frequency of the local oscillation laser as consistent with the signal carrier frequency. Another mode is the feed-forward compensation mode, whereby the frequency offset detecting apparatus 112 outputs the detection signal 113 to the digital signal processing module 116, and the digital signal processing module 116 compensates frequency offset in the signal 111 in the digital domain in accordance with the frequency offset detection signal 113.

FIG. 2 illustrates a frequency offset detecting apparatus proposed by Andreas Leven et al. ("Frequency Estimation in Intradyne Reception", IEEE Photonics Technology Letters, Volume: 19, No. 6, March 15, pages 366-368). The complex signal 109 (or 111) that enters the frequency offset detector 112 is divided into two branches, one of which is connected to a register 201, and another one is connected to a multiplier 204. The register 201 and a complex conjugate calculator 202 perform delaying and conjugating operations on the complex signal 109 (or 111) to obtain a signal 203, and output it to another input terminal of the multiplier 204. The multiplier 204 multiplies the complex signal 119 (or 111) with the signal 203, and outputs the result to a quartic calculator 205. This procedure removes influence of the phase noise of the signal on frequency offset detection. Possible values of a QPSK modulated signal might be ±π/4, ±3π/4, then the possible values of the modulation information of the signal outputted by multiplier 204 are 0, ±π/2, ±π, ±3π/4. The modulation information is removed after passing through the quartic calculator, but the frequency offset becomes four times as much at the same time. A summator 206 functions as an averager to reduce influence of additive noise on frequency offset detection. Finally, a ¼ argument calculator 207 performs ¼ argument operation on the output of the summator 206 and outputs the frequency offset detection signal 113. This detection signal is a signal phase gain introduced by frequency offset in one sampling period.

This method is problematic in two aspects. Firstly, since the output range of the ¼ argument calculator is $[-\pi/4, +\pi/4]$, the frequency offset range capable of being detected by the method is $[-Rs/8, +Rs/8]$, where Rs indicates symbol rate.

The highest symbol rate achievable in current optical transmission is 20 G symbol/second. Taking example of such a system, the frequency offset range estimable by this method is still only [−2.5 GHz, +2.5 GHz], which is only half of the required detection range of [−5 GHz, 5 GHz]. Secondly, the method includes not only multiplication operation of complex numbers but also quartic operation of complex numbers, and such computational complexity is by far higher than that of addition, subtraction and logic operations of real numbers. Insofar as the current digital signal processing technology is concerned, it is almost impractical to process symbols having rates of up to 10 G symbol/second or 20 G symbol/second in the optical transmission system with such high computational complexity.

SUMMARY OF THE INVENTION

The present invention is proposed in view of the aforementioned problems. According to one aspect of the present invention, there is provided a frequency offset estimating method and a frequency offset estimating apparatus used in an optical coherent receiver. The method and apparatus are capable of achieving stable and precise estimation of frequency offsets possibly occurring in a practical system, while the method and apparatus do not include any multiplication operation of complex numbers, thus greatly reducing computational complexity. It is possible in theory for the method to achieve stable and precise detection of frequency offset of any magnitude. Moreover, it is also possible during system design to simplify the frequency offset detecting apparatus in accordance with the symbol rate and the frequency offset detection range as needed, thus further reducing processing complexity.

Accordingly, the present application provides the following inventions.

Invention 1. A frequency offset detecting apparatus used in a digital coherent optical receiver, the digital coherent optical receiver comprising: a front-end processing section, for generating a digital baseband electric signal; an equalizer, for performing equalized filtering on the digital baseband electric signal; the frequency offset detecting apparatus, for detecting frequency offset contained in the digital baseband electric signal or in a signal outputted by the equalizer;
wherein the frequency offset detecting apparatus comprises an argument difference obtaining unit, a first subtracter, a second subtracter, a quantizer and an averager, of which the argument difference obtaining unit obtains an argument difference of adjacent symbols in a signal inputted therein; the first subtracter subtracts an output of the averager from the argument difference obtained by the argument difference obtaining unit; the quantizer performs uniform quantization with predetermined intervals on an output of the first subtracter; the second subtracter subtracts an output of the quantizer from the argument difference obtained by the argument difference obtaining unit; and the averager averages an output of the second subtracter.

Invention 2. The frequency offset detecting apparatus used in a digital coherent optical receiver according to Invention 1, characterized in that the digital coherent optical receiver uses MPSK encoding, and the quantizer is a $2\pi/M$ quantizer, namely performing uniform quantization with an interval of $2\pi/M$ on an input, wherein M indicates the number of constellation points of the signal used in M-ary phase shift keying modulation, and M is an integral power of 2, so that each symbol carries information of $\log_2 M$ bits.

Invention 3. The frequency offset detecting apparatus used in a digital coherent optical receiver according to Invention 2, characterized in that M is 2, 4, 8 or 16.

Invention 4. The frequency offset detecting apparatus used in a digital coherent optical receiver according to Invention 2, characterized in that the quantizer comprises a rounder and a multiplier, wherein the rounder divides the input of the quantizer by $2\pi/M$ and rounds up the result to be an integral number, and the multiplier multiplies the integral number with $2\pi/M$ to obtain the output of the quantizer.

Invention 5. The frequency offset detecting apparatus used in a digital coherent optical receiver according to Invention 1, characterized in that the argument difference obtaining unit comprises an argument calculator, a register and a subtracter, wherein the argument calculator obtains the argument of the baseband electric signal, the register delays the argument obtained by the argument calculator for one symbol, and the subtracter subtracts the argument outputted by the register from the argument obtained by the argument calculator.

Invention 6. The frequency offset detecting apparatus used in a digital coherent optical receiver according to Invention 1, characterized in that the digital coherent optical receiver further comprises a serial-to-parallel converter for dividing the baseband electric signal into N-branch signals, the equalizer performing equalized filtering on the N-branch signals and outputting N-branch signals having been performed with equalized filtering, and the frequency offset detecting apparatus detecting the frequency offset in the N-branch signals or the frequency offset in the N-branch signals having been performed with equalized filtering as outputted by the equalizer;
wherein the argument difference obtaining unit comprises a first argument unit, a second argument unit and a subtracter, of which the first argument unit obtains the argument of one branch signal of the N-branch signals or the argument of one branch signal of the N-branch signals having been performed with equalized filtering, the second argument unit obtains the argument of another branch signal adjacent to, and later in time for one symbol than the one branch signal of the N-branch signals or the argument of another branch signal adjacent to, and later in time for one symbol than the one branch signal in the N-branch signals having been performed with equalized filtering, and the subtracter subtracts the argument obtained by the second argument unit from the argument obtained by the first argument unit, where N is an integer greater than 1.

Invention 7. The frequency offset detecting apparatus used in a digital coherent optical receiver according to Invention 1, characterized in that the digital coherent optical receiver further comprises an extractor for low-sampling the digital baseband electric signal or the signal outputted by the equalizer to form two-branch signals differing by one symbol from each other, and the frequency offset detecting apparatus detects frequency offsets contained in the two-branch signals;
wherein the argument difference obtaining unit comprises a first argument unit, a second argument unit and a subtracter, of which the first argument unit obtains the argument of one branch signal in the two-branch signals, the second argument unit obtains the argument of the other one branch signal in the two-branch signals, and the subtracter subtracts the argument obtained by the second argument unit from the argument obtained by the first argument subtracter.

Invention 8. The frequency offset detecting apparatus used in a digital coherent optical receiver according to Invention 7, characterized in that the extractor comprises a first low-sampling unit, a second low-sampling unit and a register, of which the first low-sampling unit low-samples the digital baseband electric signal or the signal outputted by the equalizer, the register delays the digital baseband electric signal or the signal outputted by the equalizer for one symbol, and the second low-sampling unit low-samples the digital baseband electric signal or the signal outputted by the equalizer having been delayed by the register.

Invention 9. The frequency offset detecting apparatus used in a digital coherent optical receiver according to Invention 1, characterized in that the quantizer is capable of quantizing signals only within a certain range, so that an inputted signal is broken off if it is beyond the range.

Invention 10. A frequency offset detecting method used in a digital coherent optical receiver, the digital coherent optical receiver comprising: a front-end processing section, for generating a digital baseband electric signal; and an equalizer, for performing equalized filtering on the digital baseband electric signal;

the frequency offset detecting method performing, on the digital baseband electric signal or the signal having been performed with equalized filtering, processings including an argument difference obtaining step, a first subtracting step, a second subtracting step, a quantizing step and an averaging step, wherein the argument difference obtaining step obtains an argument difference of adjacent symbols in a signal to be processed thereby; the first subtracting step subtracts an output of the averaging step from the argument difference obtained in the argument difference obtaining step; the quantizing step performs uniform quantization with predetermined intervals on an output of the first subtracting step; the second subtracting step subtracts an output of the quantizing step from the argument difference obtained by the argument difference obtaining step; and the averaging step averages an output of the second subtracting step.

Moreover, the aforementioned apparatus and method can also be implemented by means of a CPU of a computing device (such as a personal computer) on the basis of operations by softwares that achieve the functions of each of the aforementioned component parts. Accordingly, computer softwares enabling the computing device to implement the aforementioned apparatus, units and method also fall within the protection scope of the present invention.

Furthermore, computer readable media storing the computer programs also fall within the protection scope of the present invention. The computer readable media can for instance be such computer readable storage media as a floppy disk, a magnetic disk, a CD, a DVD, Flash or MO that are known in the art to store by whichever means of light, electricity and magnetism, etc.

DRAWINGS ACCOMPANYING THE DESCRIPTION

SPECIFIC EMBODIMENTS

Specific embodiments of the present invention are described in greater details below with reference to the accompanying drawings.

Signals in a digital coherent optical receiver can be modulated by various modulation modes such as BPSK modulation, QPSK modulation and 8-PSK modulation. The present invention is suitable for application in all these modulation modes. For the sake of brevity, detailed explanation is made below in the case of QPSK modulation.

Figure 3:
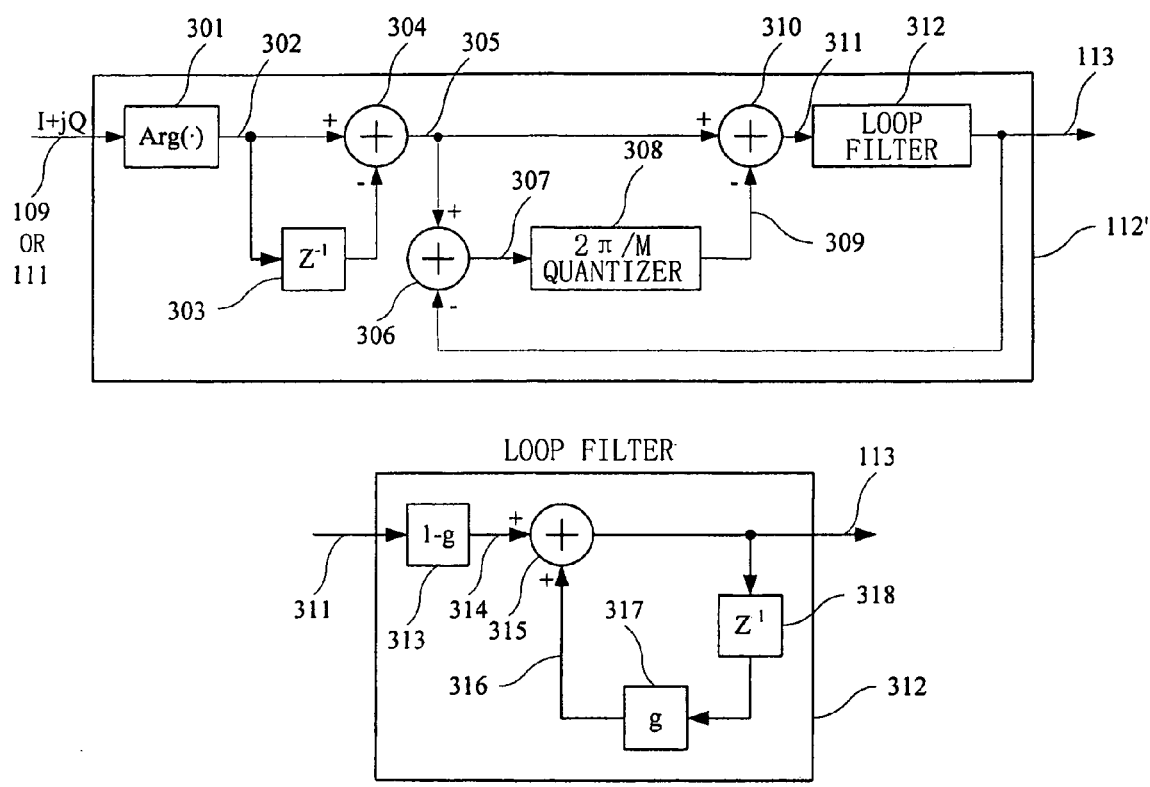
FIG. 3 shows a frequency offset detecting apparatus according to one embodiment of the present invention.

FIG. 3 illustrates a frequency offset detecting apparatus 112' according to one embodiment of the present invention. In the case of QPSK modulation, the $k^{th}$ sampling value of the complex signal 109 (or 111) can be expressed as:

$$I+jQ=A(k)\exp\{j[\Phi_{MOD}(k)+\Phi_{PN}(k)+k\Delta\omega T]\}+n_{ASE}(k)$$

where $A(k)$ is signal amplitude, $\Phi_{MOD}(k)$ is modulation information whose values are $\pm\pi/4$, $\pm3\pi/4$, $\Phi_{PN}(k)$ is phase noise, $\Delta\omega$ is frequency offset, T is symbol period, $k\Delta\omega T$ is phase gain amount introduced by frequency offset, and $n_{ASE}(k)$ is complex Gauss white noise. The argument calculator 301 obtains an argument 302 of the complex signal 109 (or 111) and outputs it to a register 303 and positive input terminals of a subtracter 304. The expression of the argument 302 is:

$$\text{argument } 302=\Phi_{MOD}(k)+\Phi_{PN}(k)+k\Delta\omega T+\Phi_{ASE}(k)+M_k 2\pi$$

Where $\Phi_{ASE}(k)$ is phase error introduced by Gauss white noise; since the output range of the argument calculator 301 is $[-\pi, \pi]$, $M_k 2\pi$ is 360-degree ambiguity introduced by the argument calculator 301. The subtracter 304 subtracts the output of the register 303 from argument 302 to obtain an argument difference 305, which is expressed as:

$$\text{argument difference } 305=\Delta\phi_{MOD}(k)+\Delta\omega T+\phi_{ASE}(k)-\phi_{ASE}(k-1)+(M_k-M_{k-1})2\pi$$

Figure 1:
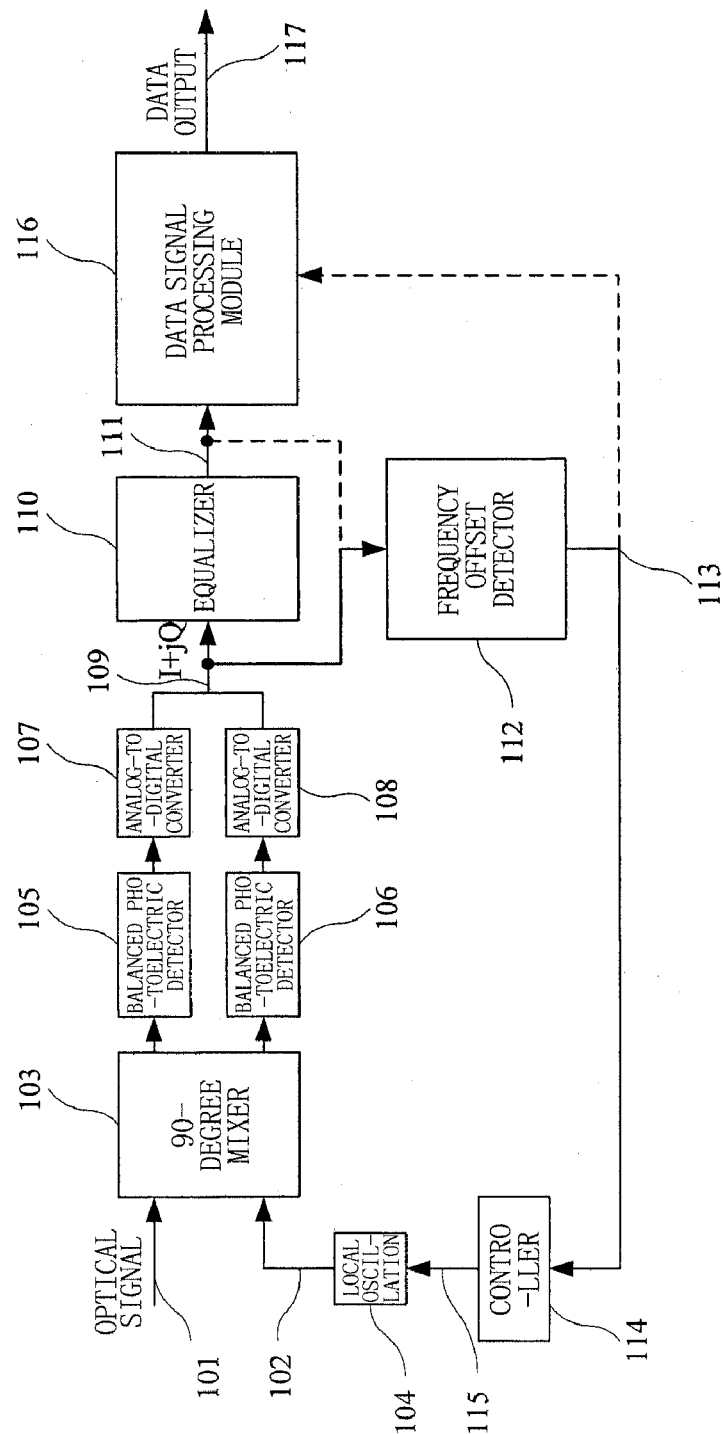
FIG. 1 is a block diagram showing a known coherent optical receiver.
Figure 2:
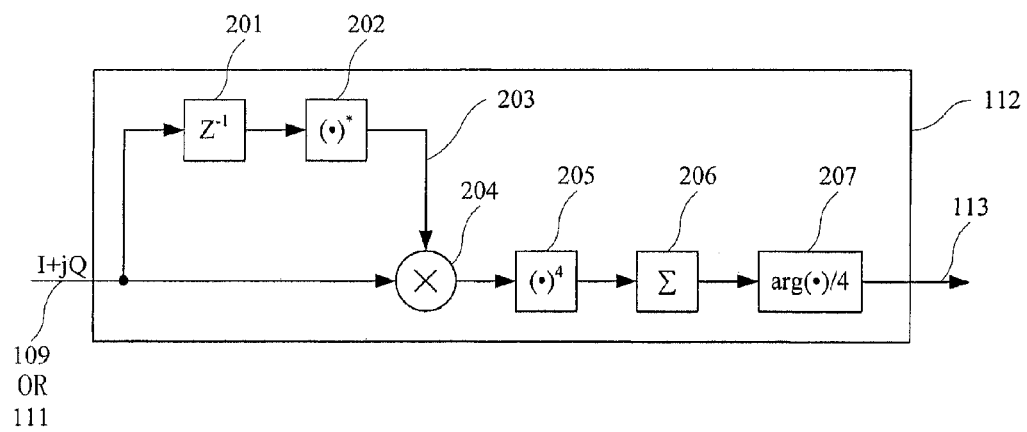
FIG. 2 is a block diagram showing a Lucent frequency offset detecting apparatus as known technology.

As should be noted, the argument difference can be obtained also by means of other methods. For example, the argument difference can also be obtained by employing elements 201, 202 and 204 as shown in FIG. 2 and performing argument operation on the output of the element 204.

Since the phase noise $\Phi_{PN}(k)$ is a slowly varying procedure, the argument difference 305 has already been removed of influence of the phase noise. The argument difference 305 is then respectively connected to positive input terminals of subtracters 306 and 310. The subtracter 306 subtracts the detection signal 113 (namely $\Delta\omega T$) from the argument difference 305 to obtain a signal 307:

$$\text{signal } 307=\Delta\phi_{MOD}(k)+\phi_{ASE}(k)-\phi_{ASE}(k-1)+(M_k-M_{k-1})2\pi$$

Since both the differential modulation information $\Delta\Phi_{MOD}(k)$ and the 360-degree ambiguity $(M_k-M_{k-1})2\pi$ are integral multiples of $\pi/2$, a summation 309 of the differential modulation information and the 360-degree ambiguity can be obtained by merely passing the signal 307 through a π/2 quantizer 308:

summation 309=Δφ$_{MOD}$(k)+(M$_k$−M$_{k−1}$)2π

The subtracter 310 subtracts the summation 309 from the argument difference 305 to obtain the signal 311:

signal 311=ΔωT+φ$_{ASE}$(k)−φ$_{ASE}$(k−1)

Noise item in the signal 311 can be considered as a fast varying, zero-mean independent random variable, and can be removed by filtering via a loop fitter 312. The loop filter 312 consists of constant coefficient multipliers 313, 317, an adder 315 and a register 318. The multiplier 313 multiplies the input signal 311 with a constant coefficient (1-g, where g is a real number greater than zero and less than 1) to obtain a signal 314, and outputs the signal 314 to an input terminal of the adder 315. The adder 315 adds the signal 314 to a signal 316, and inputs signal 113 to the register 318 at the same time of outputting signal 113. Data in the register 318, after being delayed for one symbol period, is multiplied by the multiplier 317 with a constant coefficient g to obtain the signal 316, which is outputted to another input terminal of the adder 315 for processing of the next input.

Elements 301, 303 and 304 in FIG. 3 correspond to the argument difference obtaining unit in the present invention.

The 2π/M quantizer 308 in the frequency offset detecting apparatus as shown in FIG. 3 can be implemented in two modes.

Figure 4:
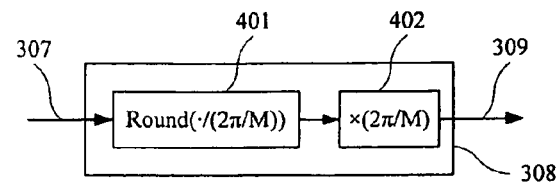
FIG. 4 shows an embodiment of a quantizer with an infinite range $2\pi/M$ employed in the frequency offset detecting apparatus according to the present invention.

FIG. 4 illustrates one embodiment of the 2π/M quantizer 308. As shown in FIG. 4, the 2π/M quantizer 308 in this embodiment consists of a 2π/M rounder 401 and a 2π/M multiplier 402 connected in series, whereby input of the quantizer is divided by 2π/M and rounded up to obtain an integral number, which is then multiplied with 2π/M to obtain output of the quantizer. This process actually completes uniform quantization with 2π/M as intervals on randomly inputted signals. The quantizer is a quantizer with an infinite range 2π/M. It can perform uniform quantization with π/2 as intervals on randomly inputted values, and M is 4, for instance, in a specific embodiment in the case of QPSK (quadrature phase shift keying) modulation mode.

Precisely because the input range of the π/2 quantizer 308 can be of arbitrary magnitude, it is possible for the frequency offset detector employing such a quantizer to detect frequency offset of arbitrary magnitude.

Figure 5:
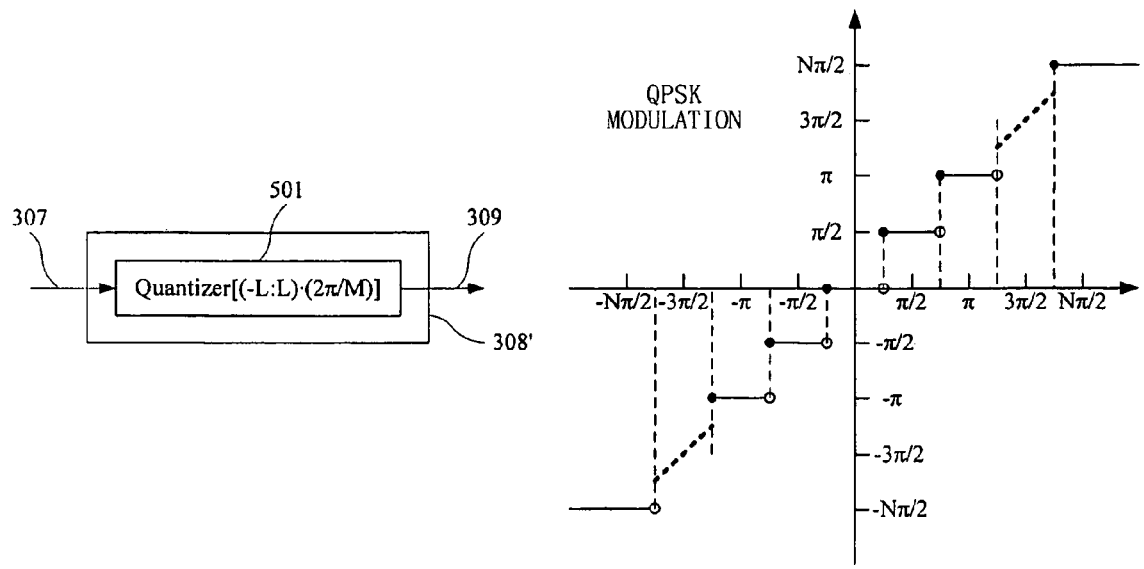
FIG. 5 shows an embodiment of a quantizer with a finite range $2\pi/M$ employed in the frequency offset detecting apparatus according to the present invention.

The advantage of the quantizer in FIG. 4 lies in its capability to perform 2π/M quantization on inputted signals of random magnitude, but this requires division and multiplication operations each for once, and hence results in very high complexity. FIG. 5 illustrates another simpler embodiment of the π/2 quantizer. Shown in FIG. 5 is an embodiment of a 2 π/M quantizer with low complexity. It is characterized in the capability of performing quantization on signals within a certain range only (say, −L×2π/M~L×2π/M), and the inputted signals will be cut off if they are beyond the range. Such a 2 π/M quantizer with low complexity can be implemented via a lookup table or through technology similar to an A/D converter. The cost for doing so is the reduction of the detection range from random magnitude to ±[1/(2M)+(L−M)/M]×R$_s$, where R$_s$ is symbol transmission rate of the system. During actual design, it is possible to select the value of L in accordance with the modulation mode, the symbol rate and the frequency offset range to be detected of the system, so as to satisfy the demand of system design with minimum complexity. For instance, in the case the symbol rate of the system is 10 G symbol/second and the required frequency offset range is ±5 GHz, if L=4, the detection range is mere ±1.25 GHz, which cannot satisfy the demand; while if L=6, the detection range is ±6.25 GHz, which satisfies system demand.

Use of the finite range π/2 quantizer 501 as shown in FIG. 5 can avoid multiplication and division operations of real numbers, thereby reducing complexity.

Figure 6:
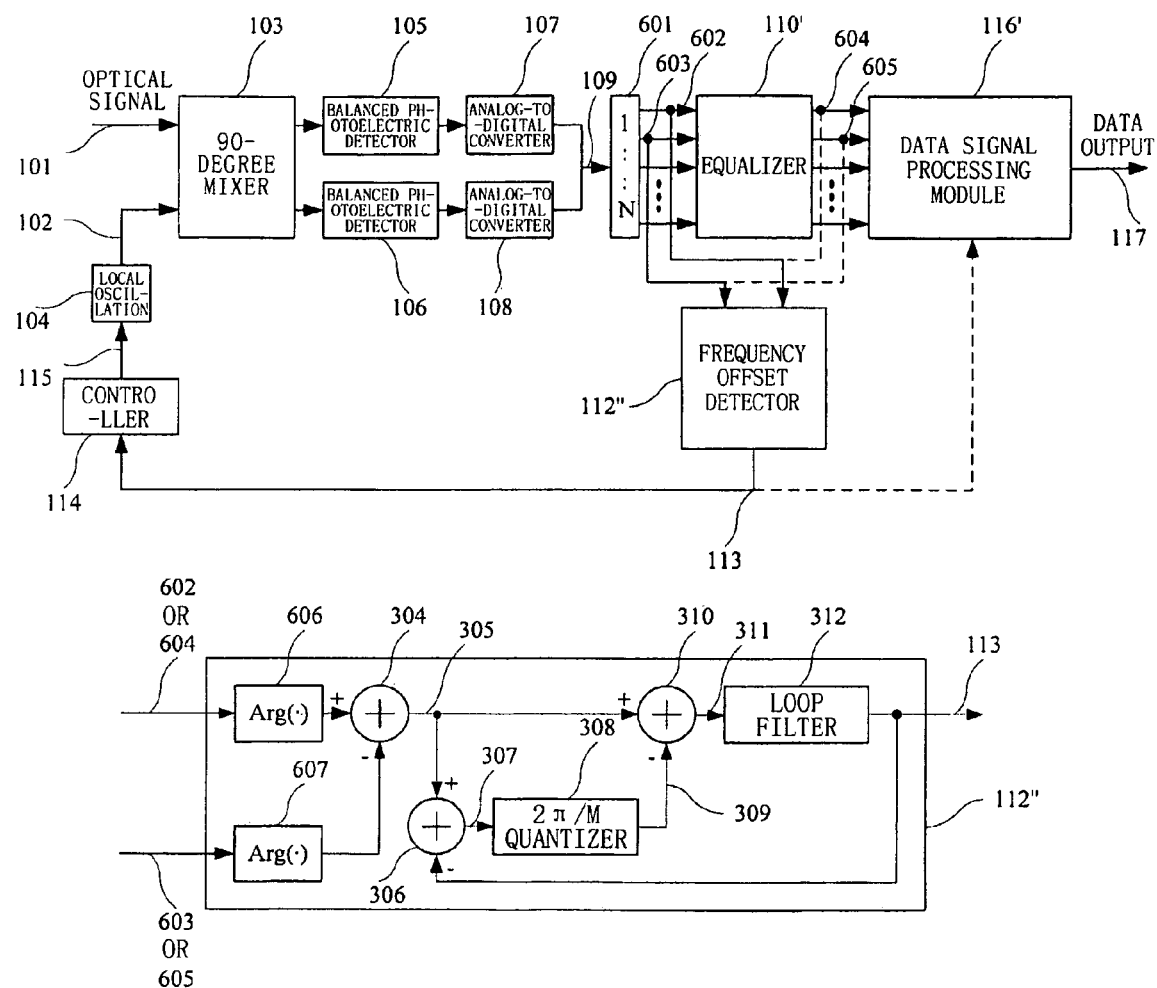
FIG. 6 shows a low-speed implementation solution of the frequency offset detecting apparatus according to the present invention (parallel)

The symbol rate of an optical communication system is usually above to 10 G symbol/second or even as high as 100 G symbol/second, so that it is still a heavy burden for the current digital signal processing capability to complete the corresponding operations in one symbol period, and there is hence a need to search for a low-speed mode of execution of the frequency offset detecting apparatus. FIG. 6 shows a low-speed implementation solution of the frequency offset detecting apparatus. The equalizer 110' and the follow-up digital signal processor 116' operate in parallel, and the complex signal sample 109 is decomposed into N branches by the serial-to-parallel converter 601 and inputted to the equalizer 110'. Two adjacent branches of signals 602 and 603 from the N branches of low-speed signals or two adjacent branches 604 and 605 from the equalizer are randomly selected as input signals of the low-speed frequency offset detector 112". The frequency offset detector 112" differs from the frequency offset detector 112' mainly in the fact that the argument calculator 301 and the register 303 of the latter are replaced with two argument calculators 606 and 607, and the input signal 109 (or 111) of the latter is also replaced with low-speed signals 602 and 603 (or 604 and 605). Thus, one round of computation by the frequency offset detector can be completed only in N symbol periods, that is to say, demand on the processing speed is only 1/N of that on the original speed. The cost for the low-speed implementation is increase of the response time of the frequency offset detector to N times of the original. The argument calculator 606, the argument calculator 607 and the subtracter 304 in FIG. 6 also correspond to the argument difference obtaining unit in the present invention.

Figure 7:
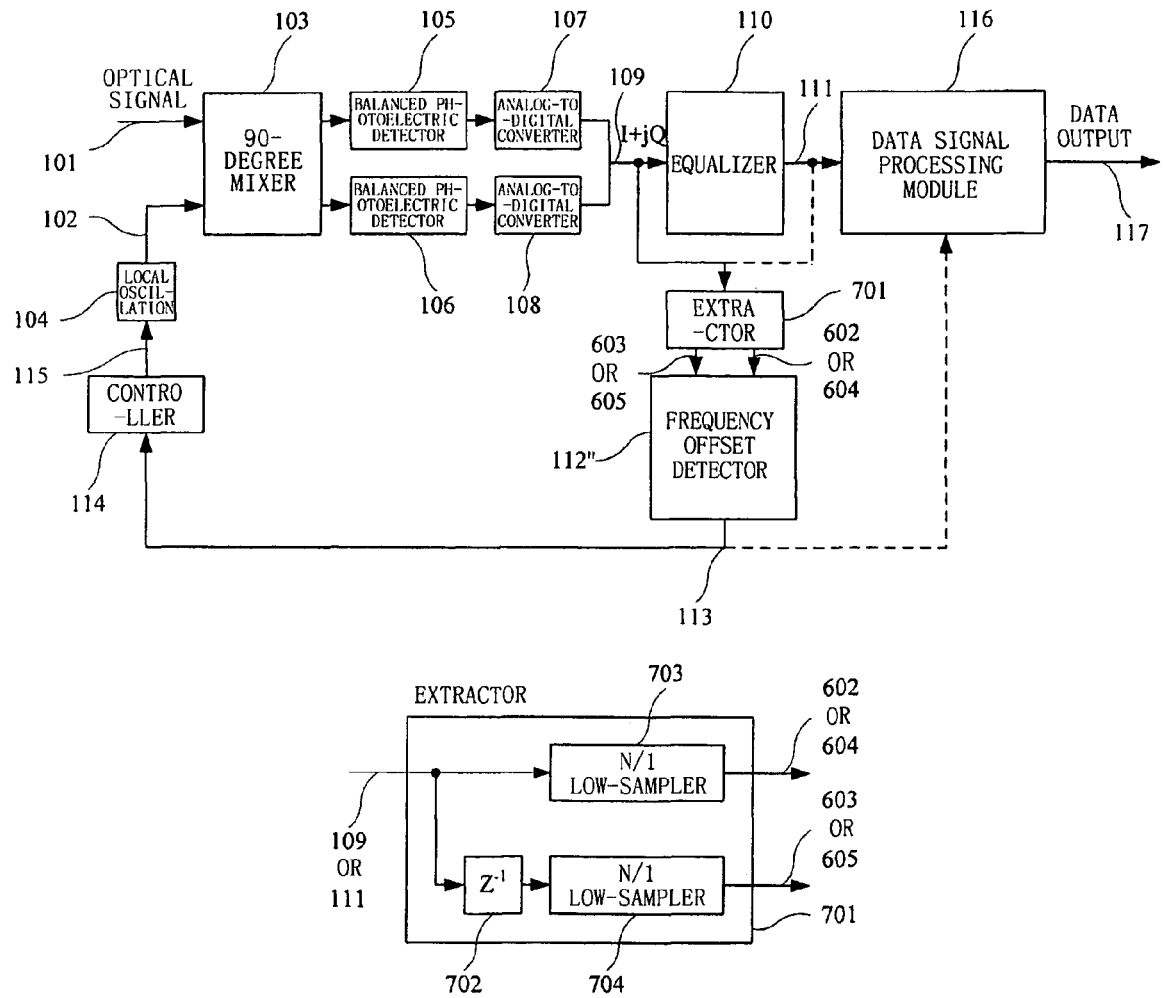
FIG. 7 shows another low-speed implementation solution of the frequency offset detecting apparatus according to the present invention (extraction)

FIG. 7 shows the operating mode of another low-speed frequency offset detector. The equalizer 110 and the follow-up digital signal processor 116 still operate in the serial mode, but the low-speed input signals 602 and 603 (or 604 and 605) needed by the low-speed frequency offset detector 112" are extracted by a signal extractor 701 from the complex signal 109 (or 111). The signal extractor 701 consists of a register 702 and two N/1 low-samplers 703 and 704. The N/1 low-samplers 703 and 704 respectively perform N/1 low-sampling on the input signal 109 (or 111) and the input signal 109 (or 111) having been delayed by the register 702 for one symbol period to obtain the low-speed signals 602 and 603 (or 604 and 605).

As noted above, although the present invention is described as regards the QPSK (quadrature phase shift keying) modulation mode, the present invention is also suitable for application in all PSK modulation modes. For instance, a π quantizer can be used as regards BPSK (binary phase shift keying) modulation mode, and a π/4 quantizer can be used as regards 8-PSK modulation mode. Generally speaking, it suffices to use a 2π/M quantizer as regards MPSK modulation mode. The π quantizer performs uniform quantization on inputted values with π as intervals, the π/4 quantizer performs uniform quantization on inputted values with π/4 as intervals, and the 2π/M quantizer performs uniform quantization on inputted values with 2π/M as intervals.

The π/4 quantizer, the π quantizer and the 2π/M quantizer can all be embodied as quantizer with infinite range and quantizer with finite range, as the corresponding π/4 quantizer, π quantizer and 2π/M quantizer can be obtained only by replacing π/2 in the π/2 quantizer as shown in FIGS. 4 and 5 with 2π/M.

Figure 8:
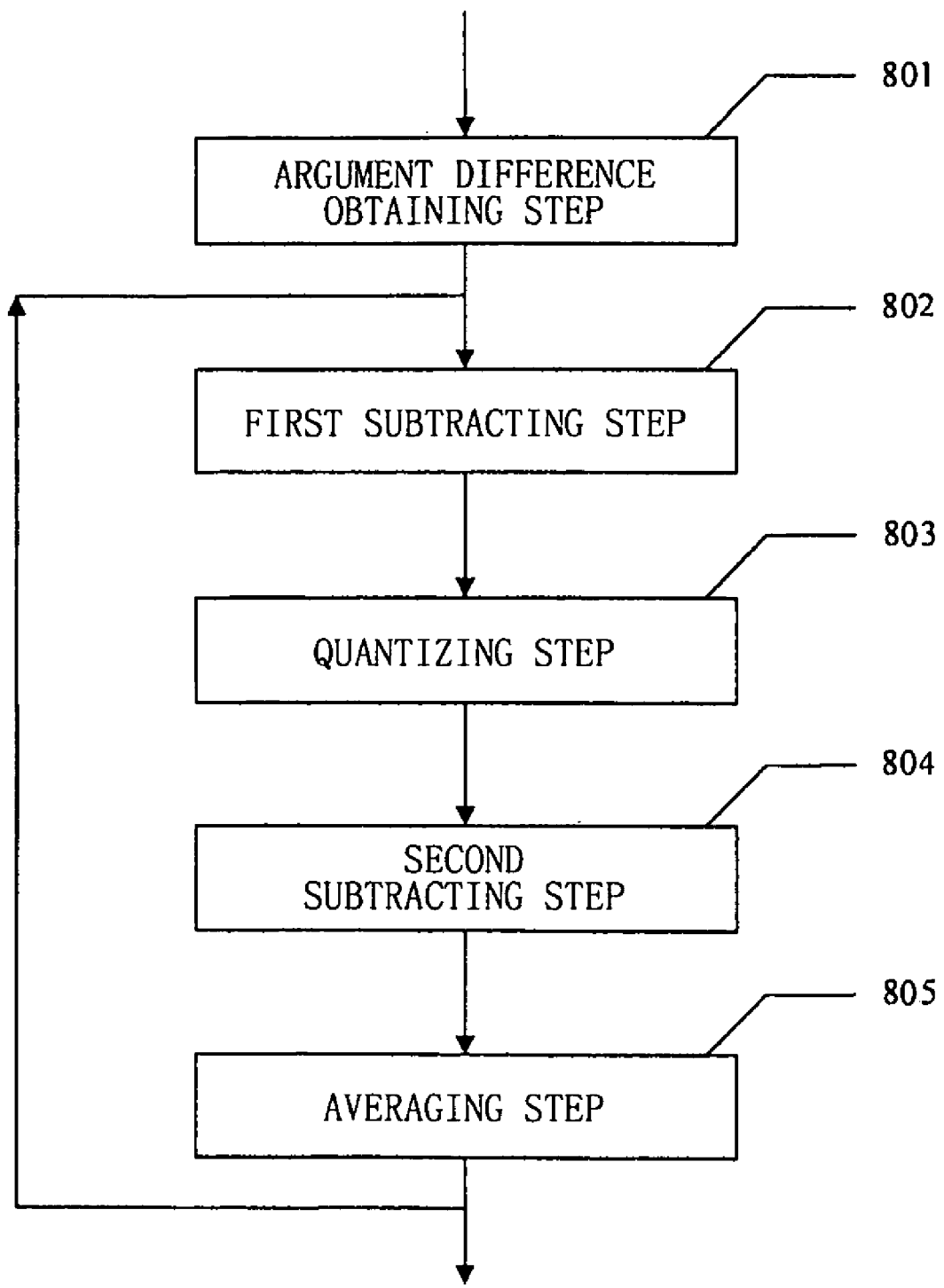
FIG. 8 is a flowchart illustrating the frequency offset detecting method according to one embodiment of the present invention.

FIG. 8 is a flowchart illustrating the frequency offset detecting method for use in the digital coherent optical receiver according to the present invention. As previously mentioned, the digital coherent optical receiver comprises a front-end processing section for generating a digital baseband electric signal, and an equalizer for performing equalized filtering on the digital baseband electric signal. As shown in FIG. 8, the frequency offset detecting method according to one embodiment of the present invention performs an argument difference obtaining step 801, a first subtracting step 802, a second subtracting step 804, a quantizing step 803 and an averaging step 805 on the digital baseband electric signal or the signal having been performed with equalized filtering.

Firstly, in the argument difference obtaining step 801, an argument difference of adjacent symbols in a signal to be processed thereby is obtained; then in the first subtracting step 802, an output of the averaging step 805 is subtracted from the argument difference obtained in the argument difference obtaining step; then the quantizing step 803 performs uniform quantization with predetermined intervals on an output of the first subtracting step 802; the second subtracting step 804 subtracts an output of the quantizing step 803 from the argument difference obtained in the argument difference obtaining step 801; and the averaging step 805 averages an output of the second subtracting step 804, outputs the averaged signal, and feeds the averaged signal back to the step 802.

It is possible to specifically implement the present invention in other modes without departing from the principle or basic features of the present invention. The embodiments as disclosed in the present application are exemplary, rather than restrictive, in all aspects. The scope of the present invention is indicated by the claims as attached rather than by the foregoing explanations, and all modifications that fall within equivalent connotation and scope of the claims are covered herein.

The invention claimed is:

1. A frequency offset detecting apparatus, used in a digital coherent optical receiver, the digital coherent optical receiver comprising:
   a front-end processing section, for generating a digital baseband electric signal; and
   an equalizer, for performing equalized filtering on the digital baseband electric signal;
   the frequency offset detecting apparatus, for detecting frequency offset contained in the digital baseband electric signal or in a signal outputted by the equalizer;
   wherein the frequency offset detecting apparatus comprises an argument difference obtaining unit, a first subtracter (306), a second subtracter (310), a quantizer (308) and an averager (312), of which
   the argument difference obtaining unit obtains an argument difference of adjacent symbols in a signal inputted therein; the first subtracter (306) subtracts an output of the averager from the argument difference obtained by the argument difference obtaining unit; the quantizer (308) performs uniform quantization with predetermined intervals on an output of the first subtracter; the second subtracter (310) subtracts an output of the quantizer (308) from the argument difference obtained by the argument difference obtaining unit; and the averager averages an output of the second subtracter (310).

2. The frequency offset detecting apparatus used in the digital coherent optical receiver according to claim 1, characterized in that the digital coherent optical receiver uses MPSK encoding, and the quantizer is a 2π/M quantizer, namely performing uniform quantization with an interval of 2π/M on an input, wherein M indicates the number of constellation points of the signal used in M-ary phase shift keying modulation, and M is an integral power of 2, so that each symbol carries information of $\log_2 M$ bits.

3. The frequency offset detecting apparatus used in the digital coherent optical receiver according to claim 2, characterized in that the quantizer comprises a rounder and a multiplier, wherein the rounder divides the input of the quantizer by 2π/M and rounds up the result to be an integral number, and the multiplier multiplies the integral number with 2π/M to obtain the output of the quantizer.

4. The frequency offset detecting apparatus used in the digital coherent optical receiver according to claim 3, characterized in that M is 2, 4, 8 or 16.

5. The frequency offset detecting apparatus used in the digital coherent optical receiver according to claim 2, characterized in that M is 2, 4, 8 or 16.

6. The frequency offset detecting apparatus used in the digital coherent optical receiver according to claim 1, characterized in that the argument difference obtaining unit comprises an argument calculator (301), a register (303) and a subtracter (304), wherein the argument calculator obtains the argument of the baseband electric signal, the register delays the argument obtained by the argument calculator for one symbol, and the subtracter subtracts the argument outputted by the register from the argument obtained by the argument calculator.

7. The frequency offset detecting apparatus used in the digital coherent optical receiver according to claim 1, characterized in that the digital coherent optical receiver further comprises a serial-to-parallel converter for dividing the baseband electric signal into N-branch signals, the equalizer performing equalized filtering on the N-branch signals and outputting N-branch signals having been performed with equalized filtering, and the frequency offset detecting apparatus detecting the frequency offset in the N-branch signals or the frequency offset in the N-branch signals having been performed with equalized filtering as outputted by the equalizer;
   wherein the argument difference obtaining unit comprises a first argument unit (606), a second argument unit (607) and a subtracter (304), of which the first argument unit obtains the argument of one branch signal of the N-branch signals or the argument of one branch signal of the N-branch signals having been performed with equalized filtering, the second argument unit obtains the argument of another branch signal adjacent to, and later in time for one symbol than the one branch signal of the N-branch signals or the argument of another branch signal adjacent to, and later in time for one symbol than the one branch signal in the N-branch signals having been performed with equalized filtering, and the subtracter subtracts the argument obtained by the second argument unit from the argument obtained by the first argument unit, where N is an integer greater than 1.

8. The frequency offset detecting apparatus used in the digital coherent optical receiver according to claim 1, characterized in that the digital coherent optical receiver further comprises an extractor for low-sampling the digital baseband electric signal or the signal outputted by the equalizer to form two-branch signals differing by one symbol from each other, and the frequency offset detecting apparatus detects frequency offsets in the two-branch signals;
   wherein the argument difference obtaining unit comprises a first argument unit (606), a second argument unit (607)

and a subtracter (304), of which the first argument unit obtains the argument of one branch signal in the two-branch signals, the second argument unit obtains the argument of the other one branch signal in the two-branch signals, and the subtracter subtracts the argument obtained by the second argument unit from the argument obtained by the first argument subtracter.

9. The frequency offset detecting apparatus used in the digital coherent optical receiver according to claim 8, characterized in that the extractor comprises a first low-sampling unit (703), a second low-sampling unit (704) and a register (702), of which the first low-sampling unit low-samples the digital baseband electric signal or the signal outputted by the equalizer, the register delays the digital baseband electric signal or the signal outputted by the equalizer for one symbol, and the second low-sampling unit low-samples the digital baseband electric signal or the signal outputted by the equalizer having been delayed by the register.

10. The frequency offset detecting apparatus used in the digital coherent optical receiver according to claim 1, characterized in that the quantizer is capable of quantizing signals only within a certain range, so that an inputted signal is broken off if it is beyond the range.

11. A frequency offset detecting method, used in a digital coherent optical receiver, the digital coherent optical receiver comprising:

a front-end processing section, for generating a digital baseband electric signal; and an equalizer, for performing equalized filtering on the digital baseband electric signal;

the frequency offset detecting method performing, on the digital baseband electric signal or the signal having been performed with equalized filtering, processings including an argument difference obtaining step, a first subtracting step, a second subtracting step, a quantizing step and an averaging step, wherein the argument difference obtaining step obtains an argument difference of adjacent symbols in a signal to be processed thereby; the first subtracting step subtracts an output of the averaging step from the argument difference obtained in the argument difference obtaining step; the quantizing step performs uniform quantization with predetermined intervals on an output of the first subtracting step; the second subtracting step subtracts an output of the quantizing step from the argument difference obtained by the argument difference obtaining step; and the averaging step averages an output of the second subtracting step.

* * * * *